United States Patent [19]

Schlonski et al.

[11] Patent Number: 4,692,297
[45] Date of Patent: Sep. 8, 1987

[54] CONTROL OF NUCLEAR REACTOR POWER PLANT ON OCCURRENCE OF RUPTURE IN COOLANT TUBES

[75] Inventors: James S. Schlonski, Monroeville; Tobias W. T. Burnett, Murrysville, both of Pa.

[73] Assignee: Westinghouse Electric Corp., Pittsburgh, Pa.

[21] Appl. No.: 692,156

[22] Filed: Jan. 16, 1985

[51] Int. Cl.[4] .................. G21C 7/32; G21C 19/42; G21C 17/00; G21C 9/00
[52] U.S. Cl. .................. 376/211; 376/316; 376/283; 376/258; 376/307
[58] Field of Search ............. 376/210, 211, 282, 283, 376/258, 307, 316, 328

[56] References Cited

U.S. PATENT DOCUMENTS

| | | | |
|---|---|---|---|
| 3,859,166 | 1/1975 | Flynn et al. | 376/282 |
| 4,104,117 | 8/1978 | Parziale | 376/210 X |
| 4,239,596 | 12/1980 | Bevilacqva | 376/282 X |
| 4,302,288 | 11/1981 | Youngborg | 376/210 |
| 4,424,186 | 1/1984 | Cook | 376/211 |
| 4,457,889 | 7/1984 | Vienne | 376/283 X |

Primary Examiner—Paul A. Bell
Attorney, Agent, or Firm—H. Diamond

[57] ABSTRACT

The overflow in the secondary of a steam generator of a nuclear-reactor plant, which occurs when one or more primary tubes conducting the coolant are ruptured, is controlled. The secondary of the steam generator, which contains the water that is converted to steam, is connected through valves to the pressurizer relief tank. The level of the liquid in the shell is monitored. An alarm is sounded when the level of the liquid in the generator reaches a predetermined height alerting the operator. When the level reaches a greater height, the valves are opened and the liquid in the shell is discharged into the pressurizer relief tank. The liquid in the tank is discharged into the containment sump when a disc is ruptured. The time taken after the rupture is 30 minutes as mandated by safety regulations. If, after the liquid in the shell reaches the level at which the valves are opened, the level drops to a height at which steam may be injected into the pressurizer relief tank, the valves are automatically closed. The valves include a normally-open valve and a normally-closed valve connected in series in each of two parrallel branches. A normally-open valve in one branch and a normally-closed valve in the other branch is connected to be actuated by one power train and a normally-open valve in the other branch and a normally-closed valve in the one branch are connected to be actuated by a second power train. Single failure protection is thus provided.

10 Claims, 3 Drawing Figures

CONTROL OF NUCLEAR REACTOR POWER PLANT ON OCCURRENCE OF RUPTURE IN COOLANT TUBES

BACKGROUND OF THE INVENTION

This invention relates to power plants whose primary energy source is a nuclear reactor. The invention has particular relationship to plants including steam generators in which steam is generated by heat interchange between the reactor coolant flowing through primary tubes and water in the outer secondary shell enclosing the tubes. The coolant is at a high pressure typically 2000 pounds per square inch. The water in the shell and the steam which is generated is at a substantially lower pressure. Typically the coolant is circulated through a large number of Ushaped tubes in heat-interchange relationship with the water in the shell.

In the operation of such nuclear power plants, it sometimes happens that one or more of the tubes is ruptured. The rupture may be a hole in a tube or a tube may be severed completely. The complete severing of a tube is described as a "double-ended rupture'. A double-ended rupture is referred to as a design-basis tube rupture because it is one of the factors which must be considered in the design of a nuclear power plant. In the case of any rupture, whether a double-ended rupture or a hole in a tube coolant which is radioactive is injected, under the pressure in the coolant system, into the water in the outer secondary shell.

A double-ended rupture results in a critical emergency because the steam-generator shell is rapidly filled with water both because of emergency feedwater flow and flow of coolant from both ends of the ruptured tube into the shell. On the occurrence of a hole in a tube, as distinct from a double-ended rupture, the emergency is less critical; the steam generator shell does not fill as rapidly as for a double-ended rupture. However, coolant is in this case injected into the liquid in the shell under the high pressure in the perforated tube and action must at some time be taken to preclude overflow. The established design considerations postulate the double-ended rupture of more than one tube. The severity of the emergency is necessarily increased on the occurrence of a multiple double-ended rupture.

The radioactivity of the fluid emerging from the steam generator shell is monitored. On manifestation of a substantial increase in radioactivity the operator of the plant is appraised of a possible rupture. Responsive to an increase in radioactivity the operator checks the rise in level of the secondary liquid in the steam generators to determine if there is a rapid rise in any generator indicating which generator has failed. The auxiliary feedwater flow is readily terminated to any generator which shows a rapid rise but the flow into the secondary shell through any ruptured tube or tubes presents difficulties. In accordance with the teachings of the prior art, the coolant or primary side of the steam generator is, on the occurrence of a rupture, cooled down by the discharge of steam from the valves on the shell side or secondary of the steam generator and by the tripping of the reactor. In addition the coolant is depressurized so that its pressure is below the pressure of the fluid on the secondary side. While the operator is waiting for these time consuming processes to be culminated, coolant is pouring into the shell side of the steam generator. Coolant which flows out of the rupture is replenished in the core by the safety-injection system, which is also enabled, on the occurrence of a rupture, to preclude overheating of the core so that the injection of coolant into the shell side of the steam generator continues without interruption.

A double-ended rupture is classified as a condition IV design-basis event by the Nuclear Regulatory Commission. Current NRC guidelines for such an event recommend that no operator action be required during the first 30 minutes after the occurrence of a condition IV event in the interest of giving the operating personnel time to overcome the shock and possible panic of the occurrence of the event and to evaluate what has happened and what action to take. But analysis reveals that under prior-art practice, the operator must begin to take action no later than 10 minutes after the occurrence of a doubleended rupture. Delay would result in steam generator overflow and flooding of the steam lines supplied by the generator. Steamline flooding not only menaces the structural integrity of the steamlines but the resulting water flow through the secondary safety facilities and poweroperated relief valves may prevent these valves from reseating and engender release of radioactivity into the environment exceeding the limits set out in 10 Code of Federal Regulatories 100.

It is an object of this invention to overcome the drawbacks and disadvantages of the prior art and to provide a method for effectively precluding overflow of a steam generator of a nuclear reactor and flooding of the steamlines supplied by the generator on the occurrence of a rupture of a tube or tubes which conduct the coolant. It is also an object of this invention to provide a nuclear reactor power plant in whose operation this method shall be practiced on occurrence of a tube rupture.

SUMMARY OF THE INVENTION

In accordance with this invention overflow of a steam generator of a nuclear reactor power plant and flooding of the steamlines, on the occurrence of a steam generator tube rupture (SGTR) on the primary side, is precluded by monitoring the level of the liquid in the shell side of the steam generator and, when a predetermined level well below the flooding level, is reached, discharging the liquid in the shell of the steam generator into a pressurizer relief tank. An alarm sounds when the water in the shell side reaches a predetermined level. The operator does not start the discharge into the pressurizer relief tank until another higher safe level. This higher level is reached about 30 minutes or other mandated time after the rupture which is indicated by the increase in radioactivity. The discharge effectively prevents overflow of the steam generator and affords the operating personnel the facility for taking no action during the mandated time.

The discharge is carried out through a nozzle and a drain line connected at an appropriate height to the shell side of each steam generator of a nuclear reactor power plant. The drain line is connected to the pressurizer relief tank through valve means including typically four motor-operated valves, a normally-open valve and a normally-closed valve in series in each of two branches connected in parallel.

This valve arrangement provides single-failure protection with respect to both initiation and termination of system operation. The pressurizer relief tank provides a collection point for periodic system flow tests. It is not contemplated that it will contain the total overflow following a tube rupture. The flow tests are conducted periodically to assure that the valves are operating properly. This overflow discharge following a steam generator tube rupture would ultimately leave the pressurizer relief tank through the tank rupture disc and flow into the containment sump.

Following a SGTR, the operator manually initiates the steam generator overflow system operation by opening one of the two normally-closed control valves. An optimum initiation level typically is about 50 inches above the high water level setpoint which is typically set at about 538 inches above the top of the tube sheet on a typical steam generator. This initiation level gives the operator about 30 minutes of margin assuming a design basis tube rupture before operator action is required. After initiation, the operator manually controls the flow of the steam generator overflow system to maintain the level above the H1 water level setpoint, i.e., the setpoint at which the alarm is sounded (See FIG. 3). The valves would also be interlocked to automatically close if the operator inadvertently permitted the steam generator water level to drop to the H1 water level setpoint. This interlock prevents steam release through the steam generator overflow system nozzle and thereby precludes an uncontrolled depressurization of the faulted steam generator.

Two additional steam generator level channels are recommended to permit manual operation of the steam generator overflow system. These level channels provide the operator with level indication from the top of the existing narrow range channels (i.e. typically 566 inches above the tube sheet) up to a level about 650 inches above the top of the tube sheet.

The maximum flowrate that the steam generator overflow system is typically sized to accommodate is 150 lb./sec. of saturated liquid at 1200 psig steam generator pressure. This maximum flowrate (control valves wide open) would match the primary to secondary equilibrium flowrate resulting from the failure of three steam generator tubes and would provide a margin of safety beyond the single-tube design-basis accident. Another consideration is that a 150 lb./sec. of saturated liquid requires only a 3-inch steam generator nozzle and this size nozzle would limit plant cooldown to less than 100° F./hr. assuming the system is actuated during an emergency during normal plant operation and releases steam.

The steam generator overflow system according to this inveniton has the following advantages.

1. A unique means of preventing steam generator shellside overflow and steamline flooding is provided.

2. The system permits a longer time period after a tube rupture before operator action is required because steam generator overflow and steamline flooding is precluded. The system increases the operator action delay time from 10 minutes to at least 30 minutes for a design basis tube rupture. This satisfies the latest industry and government guidelines with respect to safety grade operator actions.

3. The system provides a margin of safety beyond the NRC dictated design basis tube rupture, i.e. the failure of a single tube. In fact, the system can facilitate recovery from a multiple tube failure up to a maximum of three double ended tubes. The system also conserves safety injection water (i.e. refueling water) since the rupture flow is ultimately directed into the containment sump which can be used in the longer term by the safety injection pumps if required. Without the system the rupture flow may be lost through the secondary safety and relief valves.

4. The system provides a means to depressurize the faulted steam generator in the long term without releasing radioactivity to the environment. Once the initial plant recovery is completed, the next step is to place the plant in a cold shutdown condition. To accomplish cold shutdown, the faulted steam generator must be depressurized and if offsite power is lost, this means dumping radioactive steam in to the environment via the atmospheric power operated relief valves. However, the invention can be used to accomplish this depressurization of the faulted steam generator and thereby eliminate radioactivity releases to the environment in the long term.

5. A significant portion of the steam generator overflow system cost can be offset by eliminating one of two atmospheric power operated relief valves (PORV) which are normally supplied on each steamline. Two valves are installed on each line to provide redundancy for safety grade cold shutdown. However the invention can serve to provide the required redundancy and thereby eliminate one PORV and its associated block valve from each steamline.

BRIEF DESCRIPTION OF THE DRAWINGS

For a better understanding of this invention both as to its organization and as to its method of operation, together with additional objects and advantages thereof, reference is made to the following description taken in connection with the accompanying drawings, in which:

FIG. 3 shows typical levels of the liquid within a steam generator. These levels are shown for the purpose of aiding those skilled in the art in understanding this invention and not with any intention of in any way restricting the scope of this invention.

DESCRIPTION OF THE PREFERRED EMBODIMENT AND PRACTICE OF INVENTION

Figure 1:
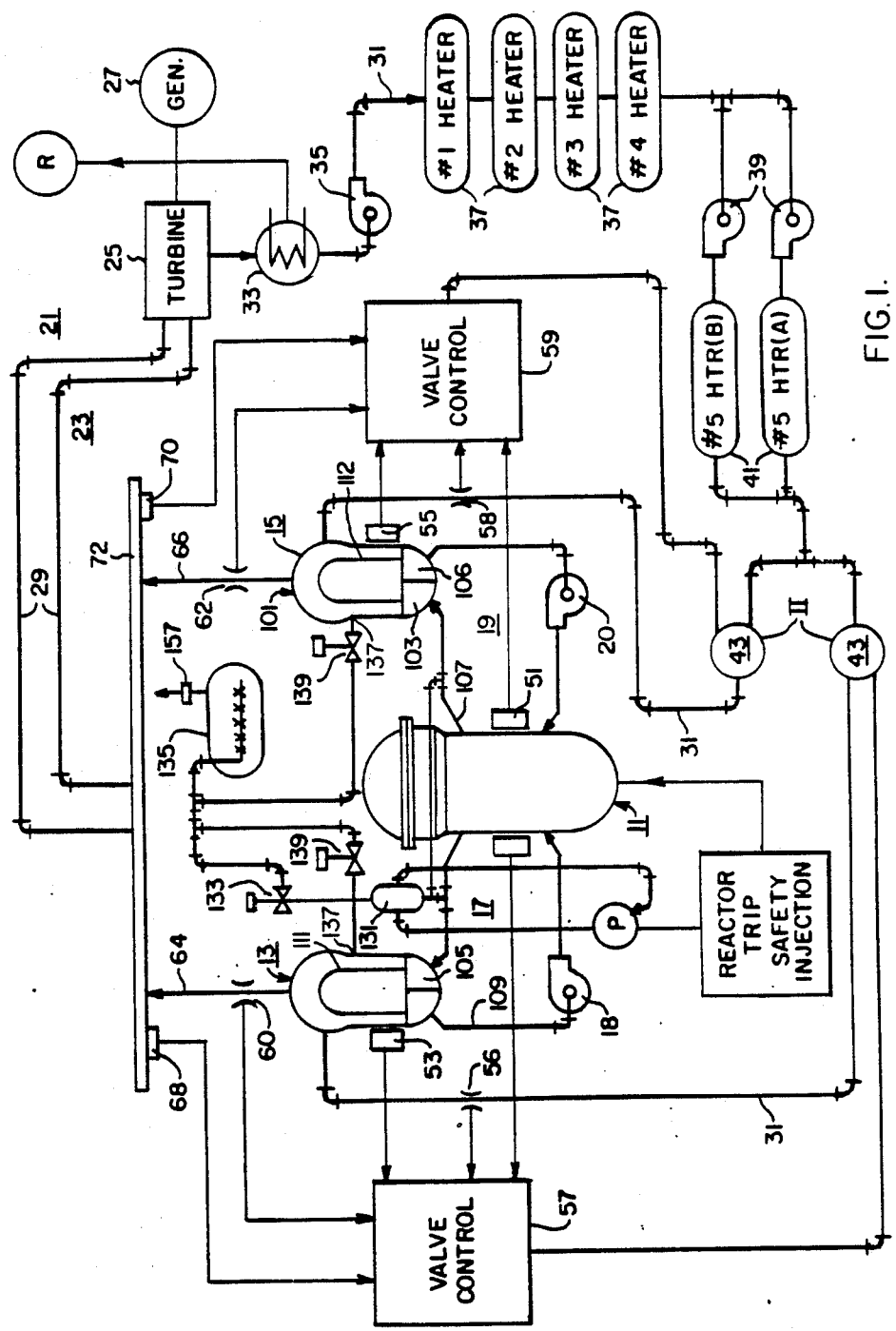
FIG. 1 is a diagrammatic view showing a nuclear-reactor power plant in accordance with this invention and which serves in the practice of the method of this invention.

The plant shown in the drawings is a power-supply apparatus including a nuclear reactor 11 in thermal heat-exchange relationship with a plurality of steam generators 13 and 15. A primary loop 17 and 19 respectively, each including a pump 18 and 20, thermally interconnect the reactor 11 and each of the generators 13 and 15. Coolant, typically pressurized water at about 2000 psi, flows through the core (not shown) of the reactor 11 and through each of the generators 13 and 15. The heat derived by each primary loop 17 and 19 from the core vaporizes the water in each generator 13 and 15. A secondary loop 21 and 23 is associated with each generator 13 and 15, respectively.

While this invention is uniquely suitable for steam-driven apparatus, the reference to "water" and "steam" in this application is not intended to limit this invention. To the extent that this invention is applicable to power generators driven by fluids, for example liquid sodium other than water, such application is within the intended scope of equivalents thereof and the use of words "water" and "steam" in this application and its claims, used in the interest of convenience, is intended to include within its scope such other fluids to the extent that this invention is applied to plants using such other fluids.

The plant shown in the drawings also includes a turbine 25 and an electrical generator 27 driven by the turbine 25. Each secondary loop 21 and 23 includes a first branch 29 for supplying steam from each steam generator 13 and 15 to drive the turbine 25, and a second branch 31 for supplying feedwater from the turbine 25 to the corresponding steam generators 13 and 15. Common to the branches 31 is a condenser 33 for condensing the fluid from the turbine 25, a condensate pump 35 and a plurality of heaters 37. Each feedwater branch 31 also includes a feedwater pump 39, a heater 41, and a valve unit 43. The valve units 43 are described in more detail in Cook U.S. Pat. No. 4,424,186 which is incorporated herein by reference to the extent that its text may aid in the understanding of this invention.

The nuclear reactor 11 includes conventional sensor 51 for deriving a signal from the neutron flux dependent on the power of the reactor. Each steam generator 13 and 15 includes sensors 53 and 55 for deriving signals dependent on the secondary water level in the steam generators 13–15. There are also a sensor 56 and 58 for deriving signals measuring feedwater flow from the feedwater lines 31, sensors 60 and 62 for deriving signals measuring steam flow typically from the steam lines 64 and 66, and sensors 68 and 70 for deriving steam pressure measurement typically from the steam header 72. The signals from the sensors 51, 53 and 55, 56 and 58, 60 and 62 and 68 and 70 are supplied to respective valve controls 57 and 59. The valve controls 57 and 59 control the valves in each feedwater line 31. The purpose and function of these valve controls are described in detail in Cook. They concern this invention only colaterally.

Figure 2:
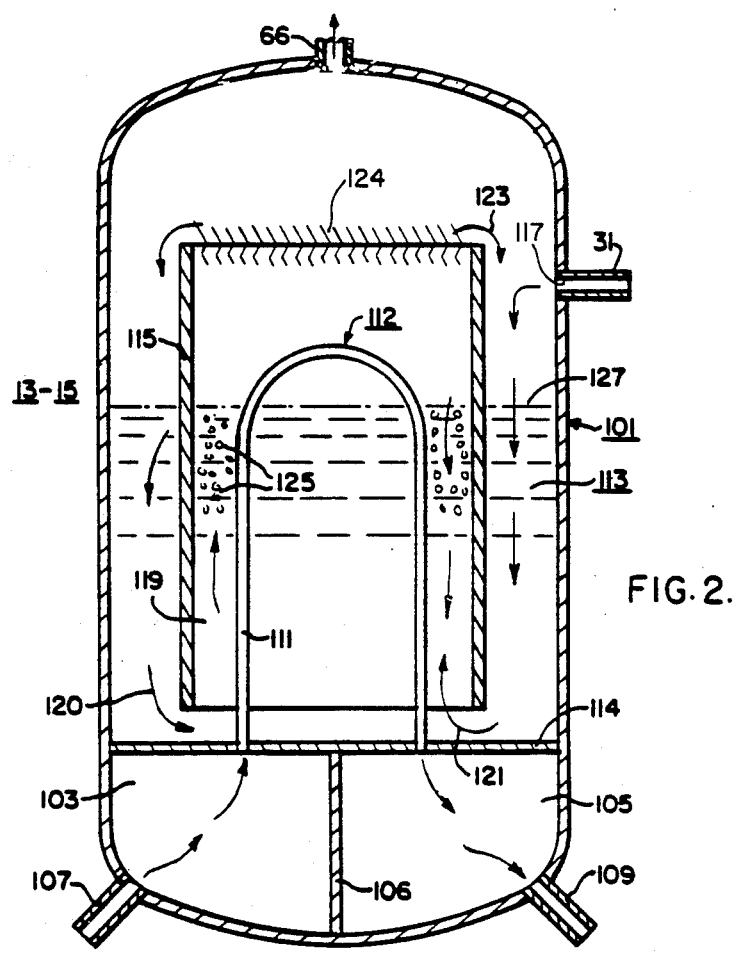
FIG. 2 is a view in longitudinal section, predominantly diagrammatic, showing a steam generator included in the apparatus shown in FIG. 1.
Figure 3:
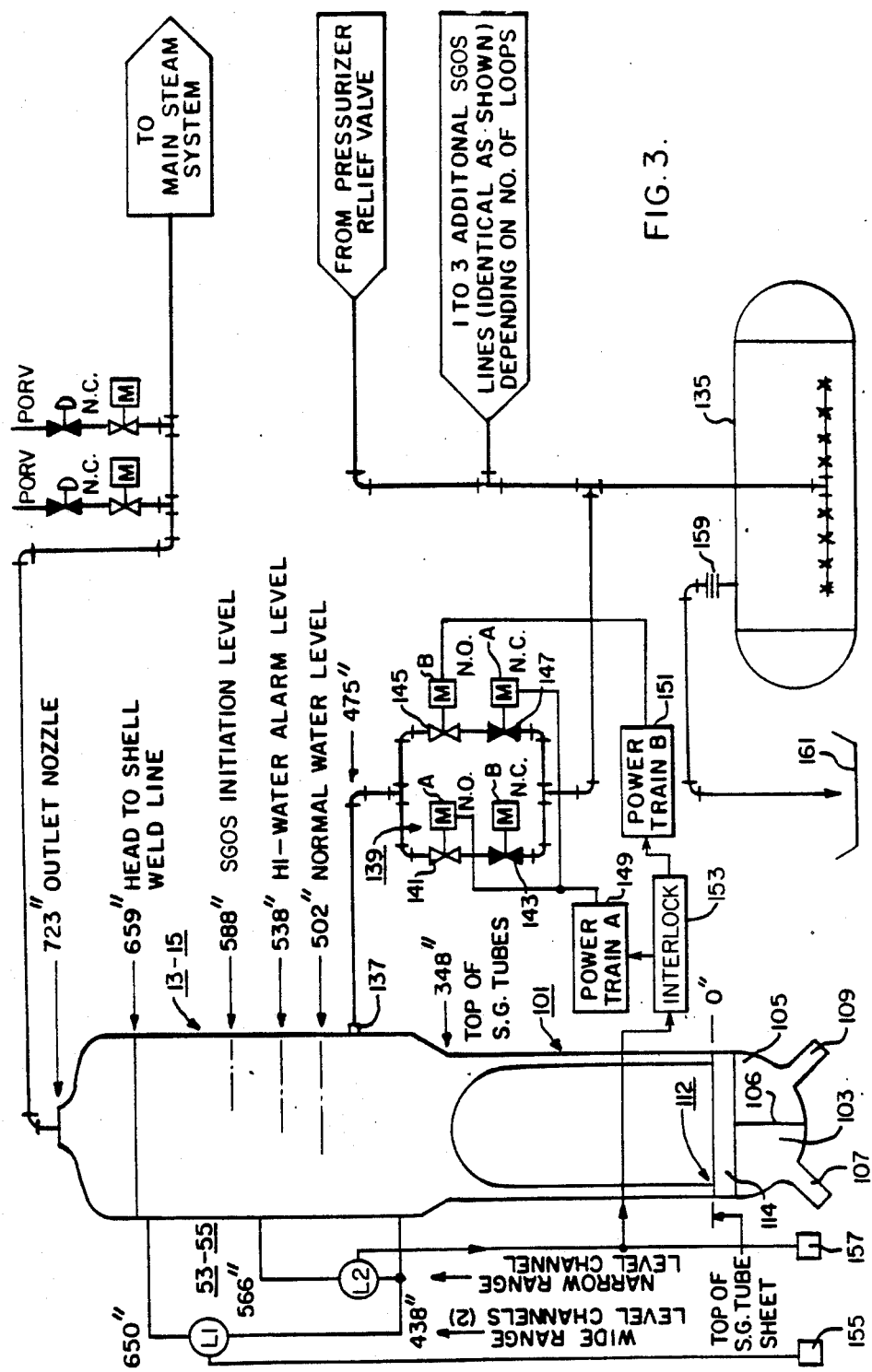
FIG. 3 is a diagrammatic view enlarged of the portion of the apparatus shown in FIG. 1 which serves to drain liquid from the shell side of a steam generator in the practice of this invention.

Each steam generator 13–15 (FIGS. 2, 3) includes a vessel or shell 101 having at the bottom an inlet plenum 103 and an outlet plenum 105. The plenums are separated by a wall 106. The hot leg 107 of a loop 17 or 19 is connected to the inlet plenum 103 and the cold leg 109 of each loop is connected to the outlet plenum 105. Coolant from the reactor 11 is conducted to the plenum 103 through the hot leg and away from the plenum 105 back to the reactor 11 through the cold leg 109. The plenums 103 and 105 are spanned by, and are in communication through, a plurality of U-tubes 111 of a tube assembly 112. The tube assembly 112 includes a tubesheet 114 into which the ends of the tubes are sealed. The tube sheet 114 extends across the vessel 101 and is sealed pressure-tight along its periphery to the inner surface of the vessel. The upper surface of the tubesheet 114 is the base from which the levels shown in FIG. 3 are measured. The plenums 103 and 105 are interconnected by the U-tubes 111 (or straight through tubes). The tubes 111 conduct the coolant through the shell 101, i.e., the generator transferring heat to the feedwater 113 to generate the steam for driving turbine 25. The purpose of this invention is to enable the operator to deal effectively with the emergency which arises when one or several of the tubes 111 is ruptured, particularly where one or more of the tubes 111 is severed, and radioactive coolant is injected into the water 113.

The steam generator 13–15 also includes a shell 115 (FIG. 2) which separates the annular region 117 into which the feedwater flows from the region 119 where the steam is generated. The region 117 is called the downcomer and the region 119 the boiling region. Depending on the conditions in the boiling region 119 and in the downcomer 117 the feedwater 113 flows back and forth between these regions as shown by the arrows 120, 121 and 123 through the open bottom of shell 115 and from the steam separators 124. The portion of the steam generator including the plenums 103, 105 and the tube assembly 112 is sometimes referred to as the "coolant side" or the "primary" of the steam generator and the portion of the steam generator containing the water 113 and the steam, is sometimes referred to as the "shell side" or "secondary" of the generator. The shell side of the steam generator contains water and steam. This mixture is sometimes referred to as "fluid".

The plant shown in the drawings also includes a pressurizer 131 (FIG. 1). The pressurizer 131 is connected to the loops 17 and 19, to maintain the pressure of the coolant at the required magnitude. The pressurizer 131 is connected through valve means 133 (FIG. 1) to a pressurizer relief tank 135. When the pressure in the pressurizer 131 exceeds a predetermined magnitude, water is discharged into relief tank 135 through valve means 133. A pressure sensor P is also connected to the pressurizer 131. On substantial reduction in pressure in the pressurizer automatic-reactor trip and safety injection are enabled. The reactor 11 is deactivated by the insertion of the control rods into the core and by the addition of shim to the coolant and the injection of water into the core and coolant loops 17 and 19 is enabled to preclude overheating of the core. The reduction of pressure is also indicated on the indicator panel (not shown) of the plant. The radioactivity of the air ejected from the condenser 33 as it is evacuated is also monitored by a sensor R. The magnitude of radioactivity is indicated on the indicator panel.

The shell side of each steam generator 13–15 is, in accordance with this invention, connected, through a nozzle 137 and valve means 139, to the pressurizer relief tank 135 (FIG. 3).

The valve means 139 includes at least four valves 141, 143, 145, 147 (FIG. 3). Valves 141 and 145 are normally open and valves 143 and 147 are normally closed. Valves 141 and 143 are connected in series in one branch and valves 145 and 147 are connected in series in a second branch in parallel with the one branch. Each valve 141 to 147 is operable by a separate motor M. Two power trains 149 and 151 are provided for operating the motors M. Power train 149 is identified as A and power train 151 as B. Valves 141 and 147 are operated by power train 149 and valves 143 and 145 are operated by power train 151. This connection of the valves 141 through 147 assures that if one power train fails the other power train will be available to close or reopen a valve between the shell side of the steam generator and the pressurizer relief tank. For example assume that when the valve means 139 is to be opened power train A is disabled. Power train B will then serve to open valve 143. Now assume that after valve 143 has been opened it becomes necessary to reclose valve means 139 but power train B has failed while power train A is in operation. Power train A will then serve to close valve 141. Conversely if power train B fails, power train A will serve to open valve 147 and if power train A fails after valve 147 is opened, power train B will serve to close valve 145. The regulations governing nuclear reactor power plants do not contemplate that both power train A and power train B will fail at the same time.

The valve means 139 is manually operable. The operator can vary the opening in the valve means and thus control the level of the liquid in a steam generator 13-15 by the flow through the valve means.

Each secondary-water sensor 53-55 includes subsensors over two level ranges the subsensors L1 and L2 (FIG. 3). L1 and L2 sense the level of the liquid in each steam generator 13-15 above a predetermined level, typically 438 inches above the tube sheet as indicated in FIG. 3. L1 senses and indicates the level of the liquid in steam generator 13-15 up to the height of the head-to-shell weld line, typically 650 inches above the tubesheet 114. Subsensor L1 thus senses the level at which the valve means 139 should be opened. Subsensor L2 senses the level of the liquid between the predetermined level above the tubesheet 114 and an intermediate level, indicated in FIG. 3 as 566 inches above the tubesheet. Subsensor L2 is the normal sensor which is included in a nuclear-reactor plant for control and shut-down purposes responsive to the level of the liquid in the steam generator 13-15. In the interest of precision its range is limited so that it only senses up to a level, typically 566 inches, below the level at which the valve means 139 should be opened. As is stated subsensor L1 senses and indicates that the level, typically 588 inches, at which valve means 139 should be opened has been reached. Subsensor L2 is connected to power trains 149 and 151 through an interlock 153. If, during the emergency, there is a maloperation so that the level of the liquid in a steam generator 13-15 drops to a height at which steam might flow through nozzle 137, this interlock 153 operates to reclose the valve means 139. The levels measured by subsensors L1 and L2 are also transmitted to indicators 155 and 157.

On the occurrence of a rupture in one or more tubes 111, coolant is injected into the liquid 113 in one of the steam generators 13-15. The radioactivity sensor R transmits an indication of increased radioactivity sensor R the operator that a rupture may have occurred. The pressure in pressurizer 131 is reduced and the reactor is tripped and the safety injection is enabled. The operator directs his attention to the level indications of subsensor L1 of the several steam generators 13-15. The defective steam generator is identified when the level of the liquid in its shell reaches a predetermined height, typically 538 inches which is above the "normal level" 502 inches above the tube sheet for example. At this point an alarm is sounded for the defective generator. The operator now prepares to open the valve means 139. The valve means is opened when the level of the liquid in the defective steam generator 13-15 reaches a predetermined height, typically 588 inches. This height is reached about 30 minutes, or other mandated interval, after the primary-tube rupture. The operator now opens the valve means and controls the outflow so as to control the level of the liquid in the shell. If control is lost so that the level drops to a height at which steam may be ejected through nozzle 137, the interlock 153 is operated and the valve means 139 is closed. As the water flows into pressurizer relief tank 135, the pressure in the tank builds up until rupture disc 159 is opened discharging water from tank 135 into containment sump 161. The reactor plant is ultimately completely shut down so that remedial action can be taken.

While preferred practice and a preferred embodiment of this invention have been disclosed herein, modifications thereof are feasible.

What is claimed is:

1. The method of controlling the operation of a nuclear-reactor plant on the occurrence of rupture in the coolant channel of the steam generator which rupture raises the level of the liquid in said steam generator; the said method including the steps of:
   (a) monitoring the level of the liquid in the vaporizing means of the steam generator, and
   (b) when said level reaches a predetermining height, conducting said liquid to said pressurizer relief tank of said nuclear reactor plant to maintain the liquid in said vaporizing means at a predetermined level at which flooding of the steam line of the steam generator is precluded.

2. The method of claim 1 including the additional step of terminating the conduction of the liquid to the pressurizer relief tank automatically if, after the said conduction has been initiated responsive to the rising of the level of the liquid to the conduction-demanding height, the level of the liquid drops to a lower height at which vapor from the vaporizing means may be discharged into the pressurizer relief tank.

3. The method of claim 1 including the additional step of transfering the liquid in the pressurizer relief tank which was conducted from the steam generator from the pressurizer relief tank to a sump within the containment of the nuclear reactor plant on the build of excessive pressure in the pressurizer relief tank.

4. The method of claim 1 wherein the conduction of the liquid from the vaporizing means to the pressurizer relief tank is at a controlled rate.

5. The method of claim 1 wherein the monitoring step includes the additional substeps of enabling an alarm when the liquid in the vaporizing means reaches a first predetermined level below the predetermined height, and thereafter enabling the conduction of the liquid to the pressuirzer relief tank when the predetermined height is thereafter reached, a predetermined time interval after the enabling of the alarm in the event of a rupture in the channel.

6. A nuclear-reactor power plant including a nuclear reactor, a steam generator, said steam generator having channels, connected to said reactor, for circulating the coolant from said reactor, said steam generator also including means, to contain water in heat interchange relationship with the coolant circulated in said channels, for vaporizing said water, said coolant during normal operation of said plant being at a substantially higher pressure than the fluid in said vaporizing means, said plant also including a pressurizer and a pressurizer relief tank, connected to said pressurizer, for receiving liquid from said pressurizer on the occurrence of excess pressure in said pressurizer, and means, connecting said vaporizing means to said pressurizer relief tank, for discharging the resulting liquid in said vaporizing means into said pressurizer relief tank when coolant flows into said water in said vaporizing means on the occurrence of a rupture in said coolant channels, said connecting means including normally-closed valve means, interposed between said vaporizing means and said pressurizer relief tank, to be opened on the occurrence of said rupture in said channels.

7. The nuclear-reactor plant of claim 6 wherein the valve means includes a first branch including in series a normally-open valve and a normally-closed valve and a second branch in parallel with said first branch also including in series a normally-open valve and a normally-closed valve, said plant also including a first power train and a second power train, said first power train being connected to said normally open valve of said first branch and to said normally-closed valve of said second branch so that said first power train may be actuated selectively to close or open said normally-open valve of said first branch or to open or close the normally-closed valve of said second branch, and said second power train being connected to said normally-open valve of said second branch and to said normally-closed valve of said first branch so that said second power train may be actuated selectively to close or open said normally-open valve of said second branch or to open or close said normally-closed valve of said second branch.

8. The nuclear-power plant of claim 6 including interlock means cooperative with the valve means and responsive to the level of liquid in the vaporizing means, for closing said valve means automatically if after the valve means has been opened on the rise of the level of liquid in said vaporizing means, the level of liquid in said vaporizing means falls to a predetermined lower level.

9. A nuclear reactor power plant according to claim 6, characterized in that discharging means for the resulting liquid is in communication with the steam generator through a nozzle which is disposed above the highest point of the coolant channels within the steam generator so as to prevent accidental water discharge to a level below the top ends of said coolant channels.

10. A nuclear reactor power plant according to claim 9, characterized by interlock means for closing the valve means if the liquid in the steam generator drops to a level below the nozzle at which level steam would undesirably flow through the nozzle.

* * * * *